US 10,982,406 B2

(12) United States Patent
Corella et al.

(10) Patent No.: US 10,982,406 B2
(45) Date of Patent: *Apr. 20, 2021

(54) TOWER FOUNDATION WITH CONCRETE BOX GIRDER BEAMS

(71) Applicant: RUTE FOUNDATION SYSTEMS, INC., Portland, OR (US)

(72) Inventors: Adrian Corella, Portland, OR (US); Doug Krause, Portland, OR (US); Zach Godsell, Portland, OR (US)

(73) Assignee: RUTE FOUNDATION SYSTEMS, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,269

(22) Filed: Jan. 24, 2020

(65) Prior Publication Data

US 2020/0157760 A1 May 21, 2020

Related U.S. Application Data

(63) Continuation of application No. 16/170,345, filed on Oct. 25, 2018, now Pat. No. 10,676,889.
(Continued)

(51) Int. Cl.
*E02D 27/42* (2006.01)
*F03D 13/20* (2016.01)
*F03D 80/80* (2016.01)

(52) U.S. Cl.
CPC .......... *E02D 27/425* (2013.01); *F03D 13/22* (2016.05); *F03D 80/80* (2016.05);
(Continued)

(58) Field of Classification Search
CPC ....... E02D 27/42; E02D 27/425; F03D 13/22; Y02E 10/727; Y02E 10/728; E02B 2017/0043; E02B 2017/0091

See application file for complete search history.

(56) References Cited

U.S. PATENT DOCUMENTS

| 4,149,306 A | 4/1979 | Tice |
| 7,665,250 B2 * | 2/2010 | Powell ..................... E04B 1/20 52/236.4 |
| 8,359,798 B2 | 1/2013 | Armbrecht et al. |

(Continued)

FOREIGN PATENT DOCUMENTS

| CN | 202388610 U | 8/2012 | |
| WO | WO-2016187720 A1 * | 12/2016 | .......... E02D 27/425 |
| WO | 2017/040019 A1 | 3/2017 | |

OTHER PUBLICATIONS

International Search Report and Written Opinion, International Patent Application No. PCT/US2018/57464 (7 pages).
(Continued)

*Primary Examiner* — Frederick L Lagman
(74) *Attorney, Agent, or Firm* — Hamre, Schumann, Mueller & Larson, P.C.

(57) ABSTRACT

Concrete foundations for supporting towers and other structures under heavy cyclical loads are described. Some or all of the major concrete components, such as the beams and the hubs, that form the foundation are fabricated off-site and then transported to the intended use site for the foundation. The concrete components can be fabricated as pre-cast segments, sections, or pieces, with the pre-cast segments then being assembled in the field at the use site to form each component, and the components then being assembled together to form the foundation. In one embodiment, the beams used in the foundation may have a box-girder construction.

14 Claims, 9 Drawing Sheets

Related U.S. Application Data (60) Provisional application No. 62/576,865, filed on Oct. 25, 2017.

(52) U.S. Cl.
CPC .. *E02D 2250/00* (2013.01); *E02D 2250/0046* (2013.01); *E02D 2300/002* (2013.01); *E02D 2600/30* (2013.01); *Y02E 10/728* (2013.01)

(56) References Cited

U.S. PATENT DOCUMENTS

| | | | |
|---|---|---|---|
| 8,661,752 B2 * | 3/2014 | Phuly | E02D 27/42 52/296 |
| 8,695,297 B2 | 4/2014 | Kniesel et al. | |
| 9,096,985 B1 * | 8/2015 | Phuly | E02D 27/42 |
| 9,592,889 B2 | 3/2017 | Nebrera Garcia et al. | |
| 9,617,704 B2 | 4/2017 | Kent | |
| 9,670,909 B2 | 6/2017 | Holscher | |
| 9,845,612 B2 | 12/2017 | Johnson et al. | |
| 10,676,889 B2 * | 6/2020 | Corella | F03D 80/80 |
| 2007/0181767 A1 | 8/2007 | Wobben | |
| 2008/0072511 A1 | 3/2008 | Phuly | |
| 2010/0043318 A1 * | 2/2010 | Armbrecht | F03D 13/22 52/173.1 |
| 2010/0132270 A1 | 6/2010 | Willey et al. | |
| 2011/0061321 A1 * | 3/2011 | Phuly | E02B 17/025 52/297 |
| 2011/0155038 A1 * | 6/2011 | Jahnig | F03D 13/25 114/264 |
| 2012/0068039 A1 | 3/2012 | Erich et al. | |
| 2012/0167499 A1 * | 7/2012 | Knisel | F03D 13/22 52/231 |
| 2013/0227898 A1 | 9/2013 | Fairbairn et al. | |
| 2014/0033628 A1 | 2/2014 | Lockwood et al. | |
| 2015/0376859 A1 * | 12/2015 | Phuly | E02D 27/02 52/223.1 |
| 2016/0201653 A1 * | 7/2016 | Holscher | E02D 27/425 405/252 |
| 2016/0230746 A1 | 8/2016 | Dagher et al. | |
| 2017/0030045 A1 | 2/2017 | Krause | |
| 2017/0183840 A1 | 6/2017 | Tozer | |

OTHER PUBLICATIONS

Randall-Smith, "New suction pile concept for offshore wind turbines", Foundations Turbines Windfarms SPT Offshore, Oct. 30, 2017 (1 page).

Tisheva, "SPT Offshore, presents wind turbine suction pile foundation concept", Renewables Now, Oct. 31, 2017 (4 pages).

* cited by examiner

TOWER FOUNDATION WITH CONCRETE BOX GIRDER BEAMS

FIELD

This technical disclosure relates to concrete foundations for supporting towers and other structures under heavy cyclical loads. More specifically, this technical disclosure relates to improved concrete foundations for supporting wind turbines.

BACKGROUND

Typical foundations and related support structures for onshore, large-scale wind turbines are formed by on-site pouring of a large, thick, horizontal, heavily reinforced cast-concrete base and a vertical cast pedestal installed over the base. Such foundation structures are referred to as a gravity foundation or a spread foundation. This requires a massive mobilization of resources to form, place steel rebar and pour concrete, and requires several weeks for construction and subsequent concrete curing prior to the tower erection work. This results in cost increases and inefficiencies in the construction and erection process. Further, the process of pouring such a massive concrete structure requires diligence to avoid improper curing and is replete with potential problems including the sophisticated planning and coordination required to pour large amounts of concrete per footing, in one continuous pour, without having cold joints. The volume of required concrete creates logistical problems such as requiring coordinating with multiple local batch plants for the delivery of the concrete using a large number of concrete trucks to the job site in a timely and organized manner. A further problem is the complexity of installing the rebar assembly into the foundation which requires assembling layers of steel reinforcing meshes across the full area of the foundation, while maintaining a strict geometric layout and specific spacing. This rebar assembly is made of extremely long and heavy rebar which requires the use of a crane in addition to multiple workers to install all the components of the assembly. The rebar often exceeds forty feet in length, thus requiring special transportation logistics. The installation of the rebar is a labor intensive and time-consuming task requiring a large number of well-trained workers.

In addition, conventional on-site pouring of concrete foundations can easily be disrupted by weather conditions and other site conditions, which can adversely affect the implementation of such a large-scale pour of concrete.

Another problem is thermal cracking of concrete due to overheating of the concrete mass during curing. When concrete is cast in massive sections, the temperature can reach high levels and the risk of thermal cracking becomes very high. Thermal cracking compromises the structural integrity of concrete foundations.

Another problem of the conventional gravity or spread foundations is their weight and monolithic final form. A wind turbine generator machine and tower has a lifecycle of generally 20 years, after which the steel machine is valuable for recycled steel. The conventional foundation however, is abandoned in the ground and cannot be effectively reused, or removed from the land.

To avoid these problems, it is known to pre-cast wind turbine foundation components off-site. An example of a concrete foundation formed from pre-cast components that are created off-site from the intended foundation site are described in U.S. Patent Application Publication No. 2017/0030045 the entire contents of which are incorporated herein by reference.

SUMMARY

Concrete foundations for supporting towers and other structures under heavy cyclical loads are described herein. In one non-limiting example, the concrete foundations described herein can be used to support the vertical towers of wind turbines. However, the concrete foundations described herein can be used to support other vertical tower structures as well.

Some or all of the major concrete components, such as the beams and the hubs, that form the foundation are fabricated off-site and then transported to the intended use site for the foundation. In one embodiment, the concrete components are fabricated as pre-cast segments, sections, or pieces, with the pre-cast segments then being assembled in the field at the use site to form each component, and the components then being assembled together to form the foundation. However, each component of the foundation may be fabricated as a single piece as well, with the components then being assembled with the other components to form the foundation.

In one foundation described herein, a foundation that supports a tower, such as a tower of a wind turbine, includes a hub, such as a pre-cast concrete hub, and a plurality of concrete beams, such as pre-cast concrete beams, projecting outward from the hub, for example at equal circumferential intervals. Each of the concrete beams can be formed as a box girder construction where the beams are at least partially hollow over their length. The beams and the hub can be secured to one another and post-tensioned using a plurality of post tensioning cables.

In another foundation described herein, a foundation that supports a tower, such as a tower of a wind turbine, includes a hub, such as a pre-cast concrete hub, and a plurality of concrete beams, such as pre-cast concrete beams, projecting outward from the hub, for example at equal circumferential intervals. Each concrete beam may be formed from a plurality of pre-cast concrete segment (which may be referred to as pre-cast concrete beam segments), for example from three or more pre-cast concrete segments, with the pre-cast concrete segments then being assembled together to form each beam. The hub may also be formed from a plurality of pre-cast concrete segments (which may be referred to as pre-cast concrete hub segments), for example from three or more pre-cast concrete segments, with the pre-cast concrete segments then being assembled together to form the hub. Once assembled together, the various pre-cast segments can be secured together and post-tensioned using a plurality of post tensioning cables.

The box girder construction of the pre-cast concrete beams and the pre-cast concrete beam segments can be used separately or together. In other words, the foundation can use pre-cast concrete beams having a box girder design where the pre-cast concrete beams may or may not be formed from pre-cast concrete beam segments that are assembled together. Likewise, the pre-cast concrete beams of the foundation can be formed from pre-cast concrete beam segments that are assembled together and the resulting concrete beam may or may not have a box girder construction.

In another foundation described herein, a foundation that supports a tower, such as a tower of a wind turbine, includes a hub, such as a pre-cast concrete hub, and a plurality of concrete beams, such as pre-cast concrete beams, projecting outward from the hub, for example at equal circumferential intervals. The beams and the hub can be secured to one another and post-tensioned using a plurality of post tensioning cables. In this foundation, four of the concrete beams are provided. A conventional concrete foundation for a wind turbine typically includes 6, 8 or more concrete beams.

DETAILED DESCRIPTION

Different embodiments will now be described with reference to the drawings and those skilled in the art will understand that alternative configurations and combinations of components may be substituted without subtracting from the invention as claimed. Also, in some figures certain components may be omitted to more clearly illustrate the described embodiments.

Concrete foundations for a tower, such as a tower of a wind turbine or other mechanical systems that produce heavy cyclical loads on the foundation, are described below. Primary components of the concrete foundation are a concrete hub and a plurality of concrete beams projecting outwardly, for example radially outwardly, from the hub. The illustrated foundation includes four of the concrete beams. This is in contrast to known concrete foundations that support wind turbine towers which utilize six, eight or more concrete beams projecting outwardly from a hub.

Figure 1:
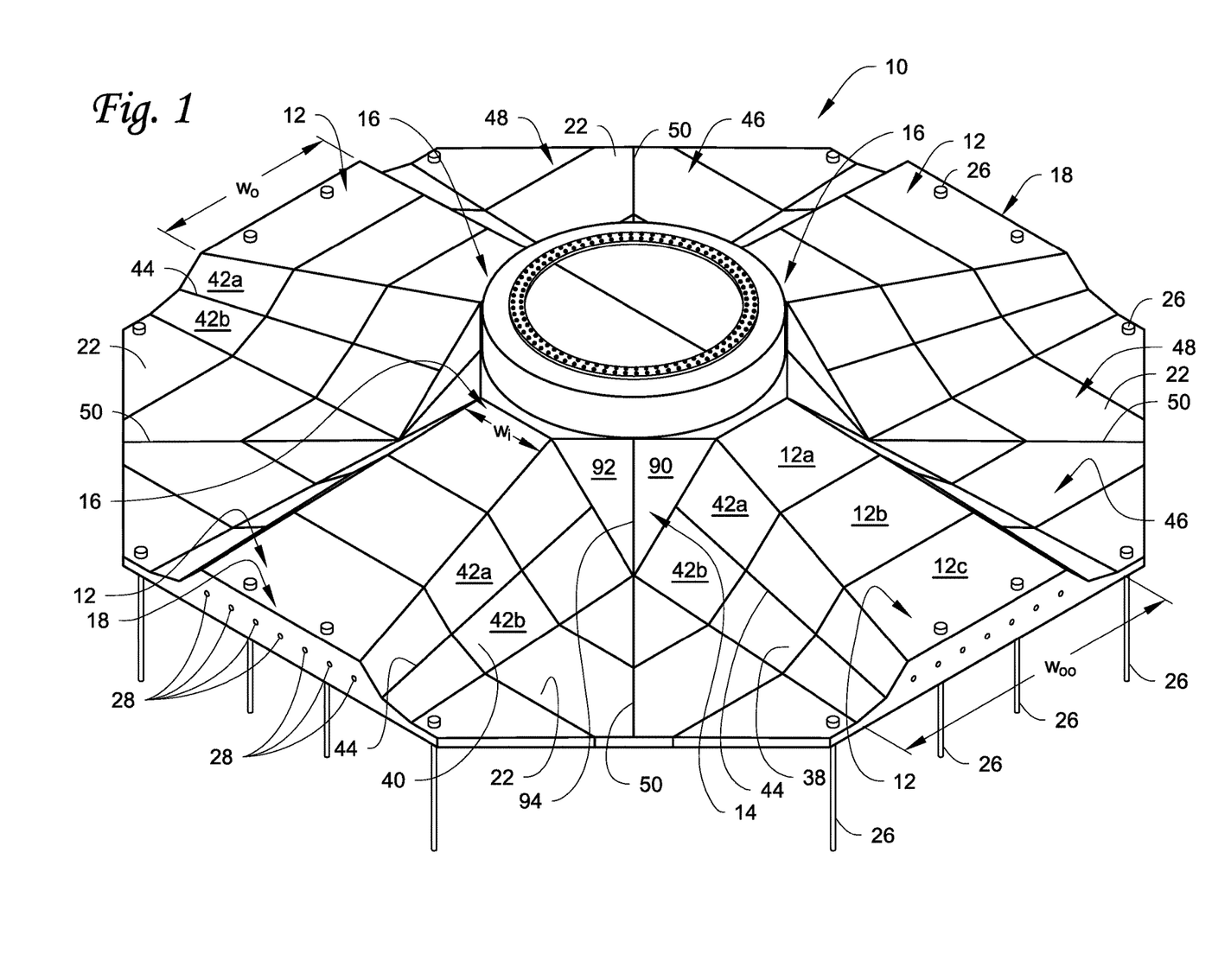
FIG. 1 is a perspective view of one example of a concrete foundation for a tower described herein.
Figure 2:
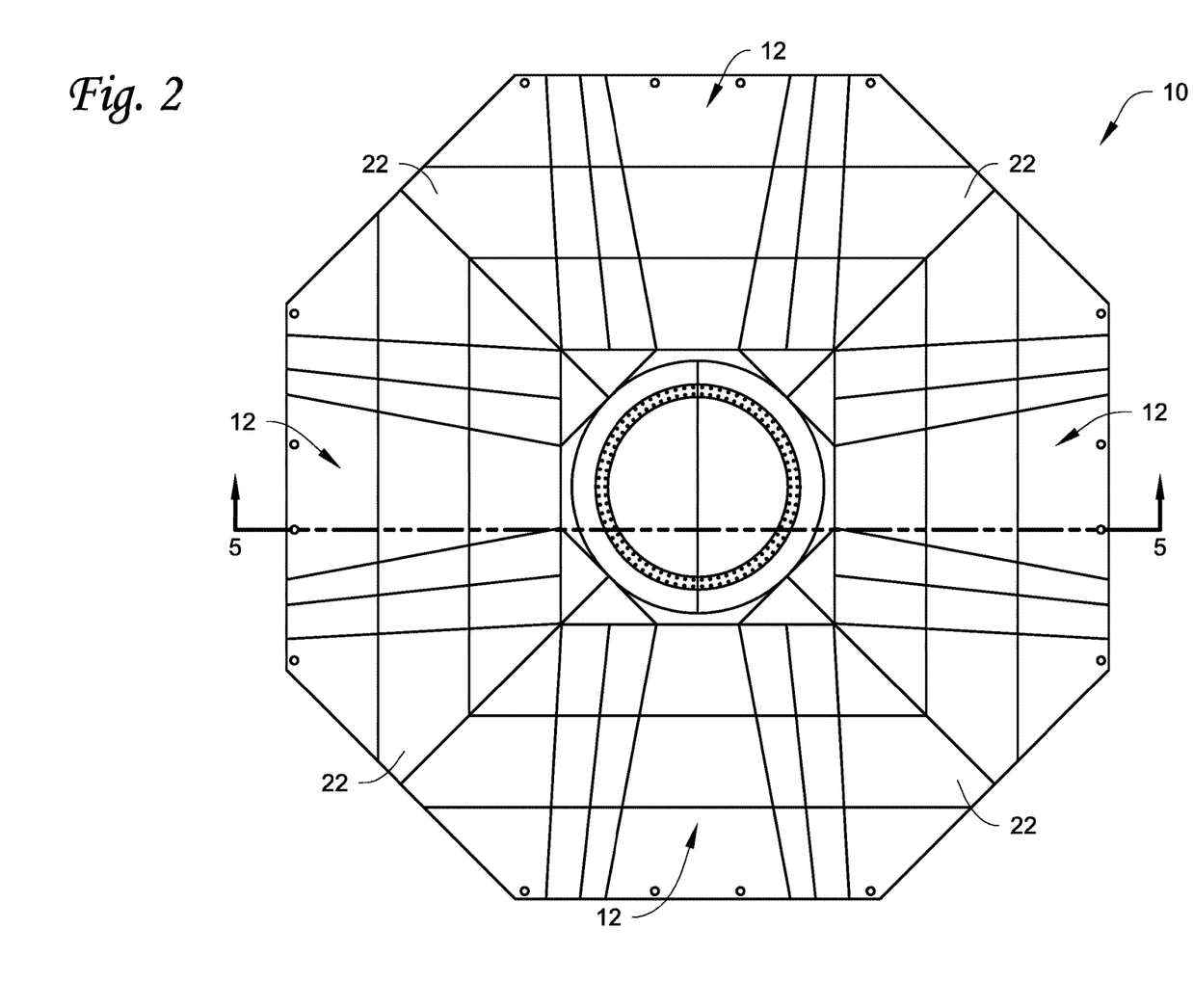
FIG. 2 is a top view of the concrete foundation of FIG. 1.
Figure 3:
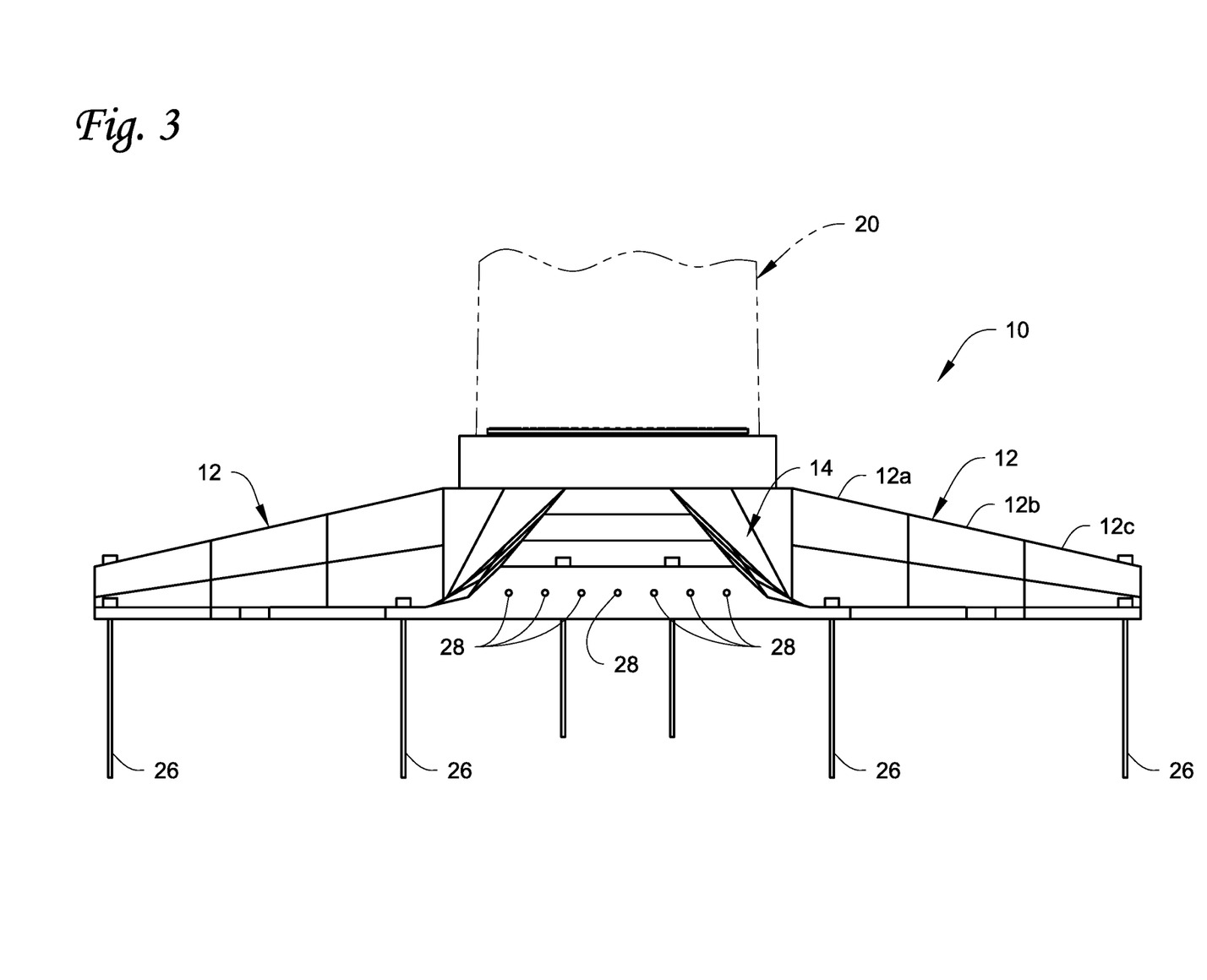
FIG. 3 is a side view of the concrete foundation of FIG. 1.

Referring initially to FIGS. 1-3, a concrete foundation 10 illustrated therein that supports a tower includes a plurality of, in this example four, pre-cast concrete beams 12 and a center hub 14. As described in further detail below, each of the pre-cast concrete beams 12 can have a box girder construction. A box girder beam as used herein is a beam that is generally hollow and forms one or more enclosed cells with multiple walls. The cells of the box girder beams are generally hollow from an inner end 16 of the beam 12 that faces the center hub 14 and extending toward an outer end 18 of the beam 12. However, the outer end 18 is closed. The tubular nature or generally hollow construction of the box girder beams 12 is distinguished from and different than passageways that may be formed in a beam to permit passage of post-tensioning cables described further below. In other words, passageways formed in a beam specifically for post-tensioning cables do not define one or more enclosed cell(s) or make the beam generally hollow, and do not make the beam a box girder beam.

The center hub 14 is disposed at the center of the concrete beams 12. The center hub 14 may also be formed of pre-cast concrete. The center hub 14 forms a structure to which a lower end of a vertical tower 20 (partially shown in dashed line in FIG. 3) is suitably secured to support the tower 20. In the case of a wind turbine, the upper end of the tower 20 supports a turbine structure (not shown) including a nacelle and a rotor. However, other mechanical components may be secured to the upper end of the tower 20.

Figure 8:
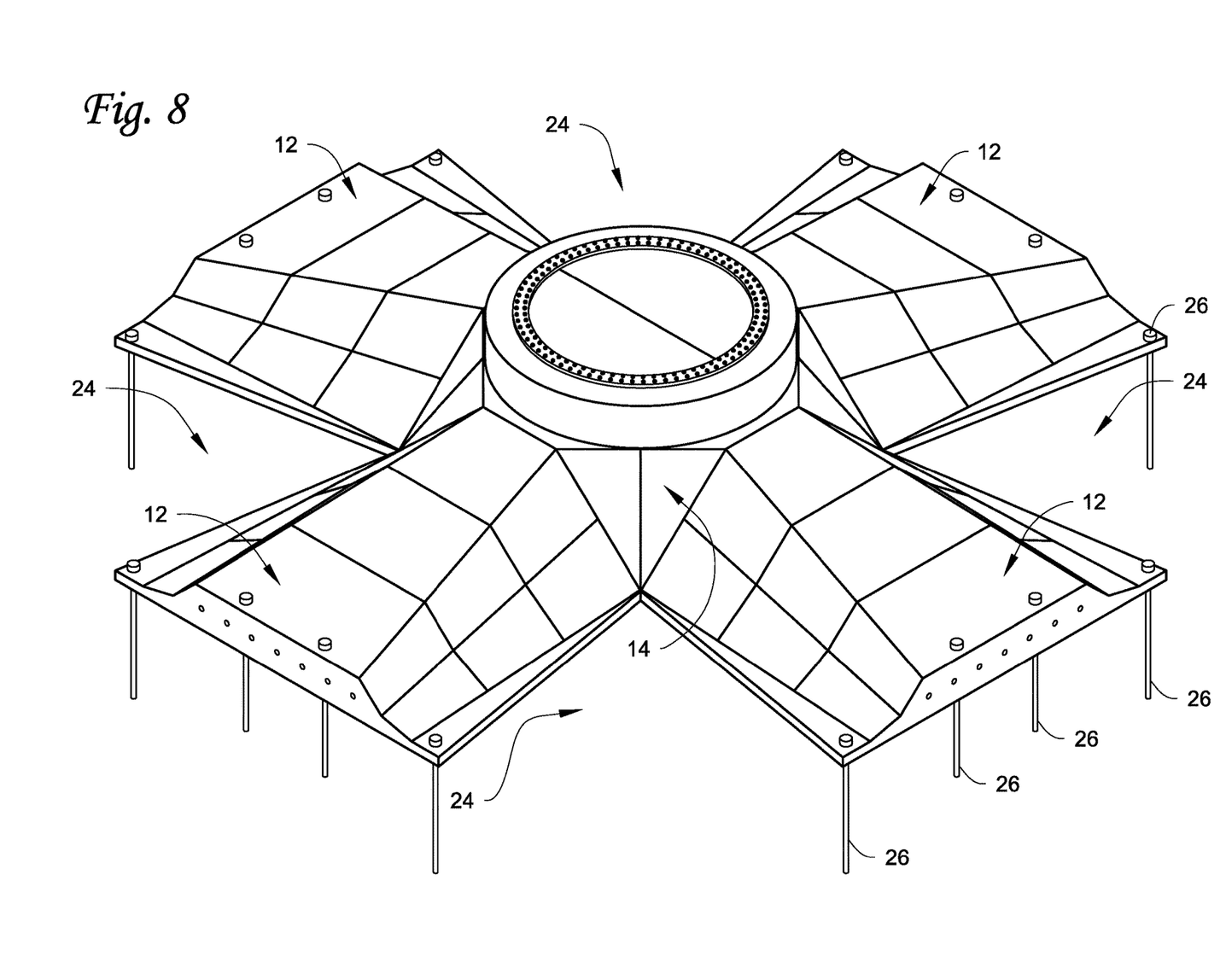
FIG. 8 is a perspective view of another example of a concrete foundation described herein.

As seen in FIGS. 1-3, slab structures 22 can extend between the concrete beams 12 so that the slab structures 22 together with the bottom walls of the beams 12 form a generally continuous slab that in use (i.e. when installed) rests on the ground or on-grade. Referring to FIG. 2, with the slab structure 22 present, the perimeter of the foundation 10 has a generally octagon shape. However, a continuous slab is not required. Instead, as shown in FIG. 8, gaps 24 can be provided between the beams 12 so that the resulting slab on grade is discontinuous with primarily the bottom walls of the beams 12 resting on the ground or on-grade when installed.

Returning to FIGS. 1-3, a plurality of anchors 26 can be provided to anchor the foundation 10 to the ground. The anchors 26 can extend through the outer ends 18 of the beams 12 and into the ground. Alternatively, the anchors 26 can extend through outer ends of the slab structures 22 and into the ground. In other embodiments, the anchors 26 can extend through both the outer ends 18 of the beams 12 and through the outer ends of the slab structures 22 and into the ground. The locations of the anchors 26 and whether they are used on the beams 12 and/or on the slab structures 22 can vary based on factors including, but not limited to, the site conditions and the anchoring needs of the foundation 10.

A plurality of post-tensioning cables 28 are provided to post-tension the beams 12 and the hub 14, and to secure the beams 12 and the center hub 14 to one another. Further details on the post-tensioning cables 28 are provided below.

Figure 5:
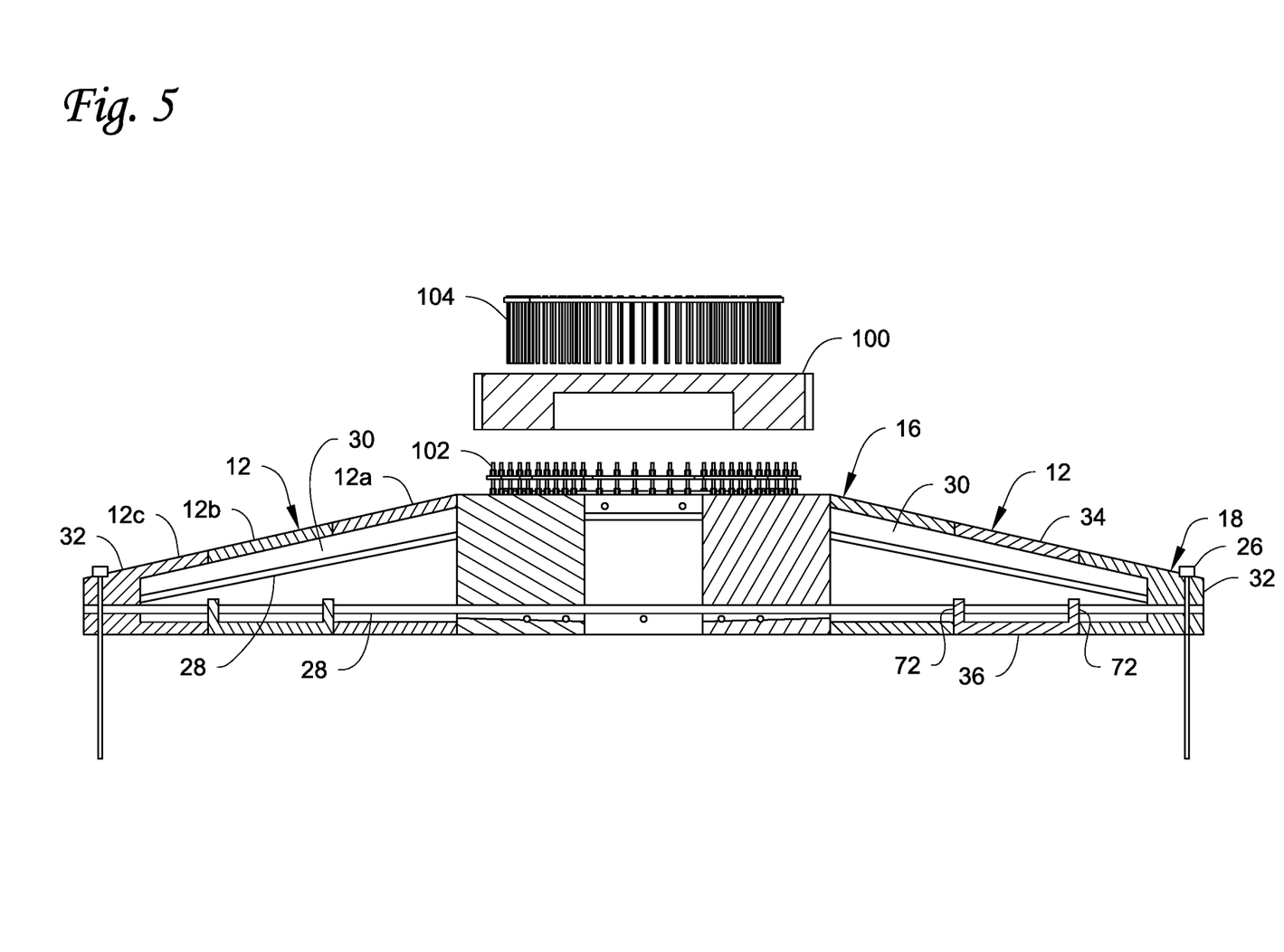
FIG. 5 is a partial cross-sectional side view through two of the opposing concrete beams taken along lines 5-5 of FIG. 2.

The beams 12 are substantially identical in construction so only one beam 12 will be described in detail, it being understood that the other beams 12 are substantially identical in construction. Referring to FIG. 5, each of the beams 12 can have a box girder configuration so that each of the beams 12 is generally hollow with at least one cell defining a hollow interior space 30 that can, for example, extend from the inner end 16 toward an outer end 18. In the example illustrated in FIG. 5, the interior space 30 stops short of the outer end 18 so that the outer ends of the beams 12 are closed, for example by an end wall 32. FIG. 5 also illustrates the post-tensioning cables 28 as extending through the interior space 30 with ends of the cables 28 secured to the end wall 32 at the closed outer ends 18 of the beams 12. Some of the cables 28 extend continuously from one side of the foundation to the other side. For example, as illustrated in FIG. 5, some of the post-tensioning cables 28 extend from one end wall 32 at one end of one of the beams 12, through the beam 12, through the hub 14 to the opposite beam 12, and to the end wall 32 of the opposite beam 12. However, some of the cables can terminate in the hub 14 and extend only to one of the end walls 32.

Referring to FIGS. 1 and 5, each of the beams 12 includes an upper wall 34, a bottom wall 36 opposite the upper wall 34, a first side wall 38 and a second side wall 40 opposite the first side wall 38. The upper wall 34 can be generally flat and planar, and slants downward from the inner end 16 to the outer end 18. As shown in FIG. 1, the upper wall 34 has a width $W_i$ at the inner end 16 and a width $W_o$ at the outer end 18, with the upper wall 34 continuously increasing in width from the inner end 16 to the outer end 18. The upper wall 34 at the inner end 16 forms a generally smooth continuation of the upper surface of the hub 14 which it abuts against when assembled.

Figure 6:
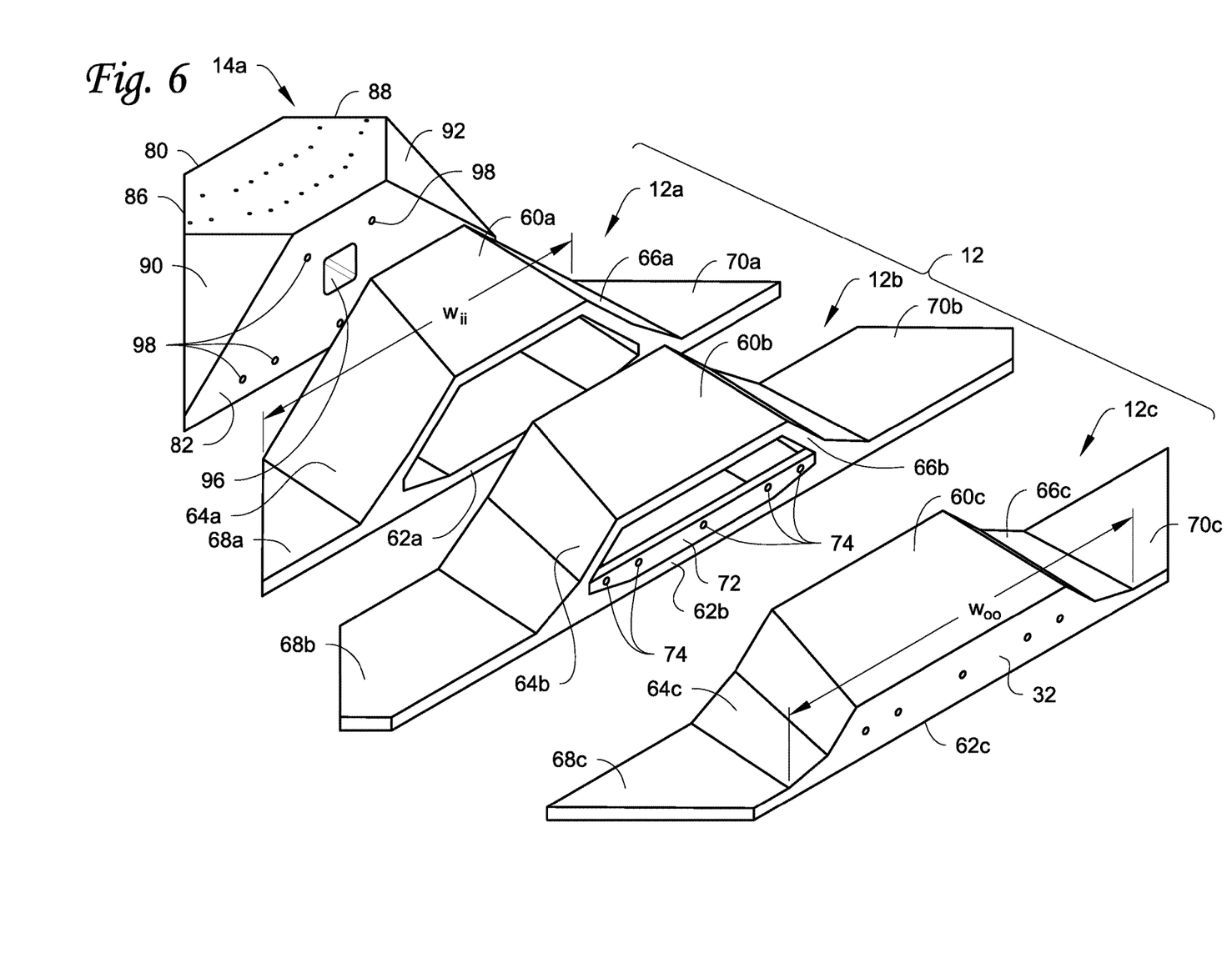
FIG. 6 is an exploded, perspective view of the beam segments of one beam and one of the hub segments.
Figure 7:
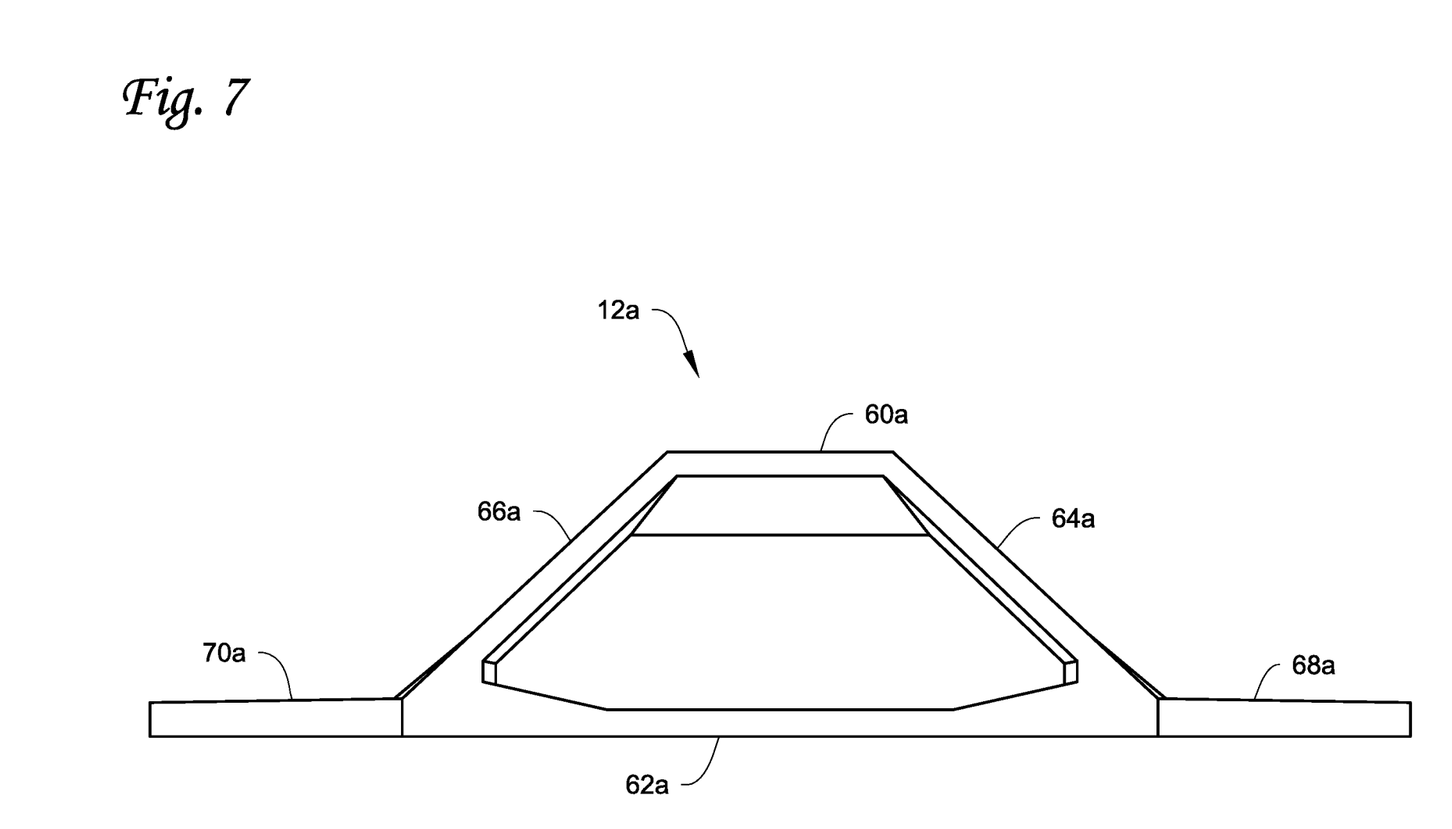
FIG. 7 is an end view looking through the inner end of the innermost one of the beam segments.

The bottom wall 36 can also be generally flat and planar and in use rests on the ground. As shown in FIGS. 1 and 6, the bottom wall 36 has a width $W_{ii}$ at the inner end 16 (see FIG. 6) and a width $W_{oo}$ at the outer end 18 (see FIG. 6), with the bottom wall 36 continuously decreasing in width from the inner end 16 to the outer end 18. The width $W_i$ of the upper wall 34 is less than the width $W_{ii}$ of the bottom wall 36, and the width $W_o$ of the upper wall 34 is less than the width $W_{oo}$ of the upper wall 36.

Referring to FIGS. 1 and 6, the side walls 38, 40 interconnect the upper wall 34 and the bottom wall 36. Each side wall 38, 40 can be formed from two flat and planar sections 42a, 42b that intersect one another at 44. The side walls 38, 40 have a height at the inner end 16 and a height at the outer end 18, with the side walls continuously decreasing in height from the inner end 16 to the outer end 18.

Slab segments 46, 48 extend from the intersection of the bottom wall 36 and the base of the side walls 38, 40 on each side of the beams 12. The slab segments 46, 48 are generally flat and planar, and have a generally triangular shape. The slab segments 46, 48 abut against one another at 50 when the foundation 10 is assembled so that the slab segments 46, 48 together form the slab structures 22. However, as shown in FIG. 8, the beams 12 need not include the slab segments 46, 48, thereby forming the gaps 24 between the beams 12.

So in each of the box-girder concrete beams 12, the beams 12 are at least partially hollow over their length, and the beams 12 and the hub 14 can be secured to one another and post-tensioned using the plurality of post tensioning cables 28. The beams 12 may be formed as a single piece of concrete or as discussed further below, the beams 12 may each be formed from a plurality of beam segments.

Figure 4:
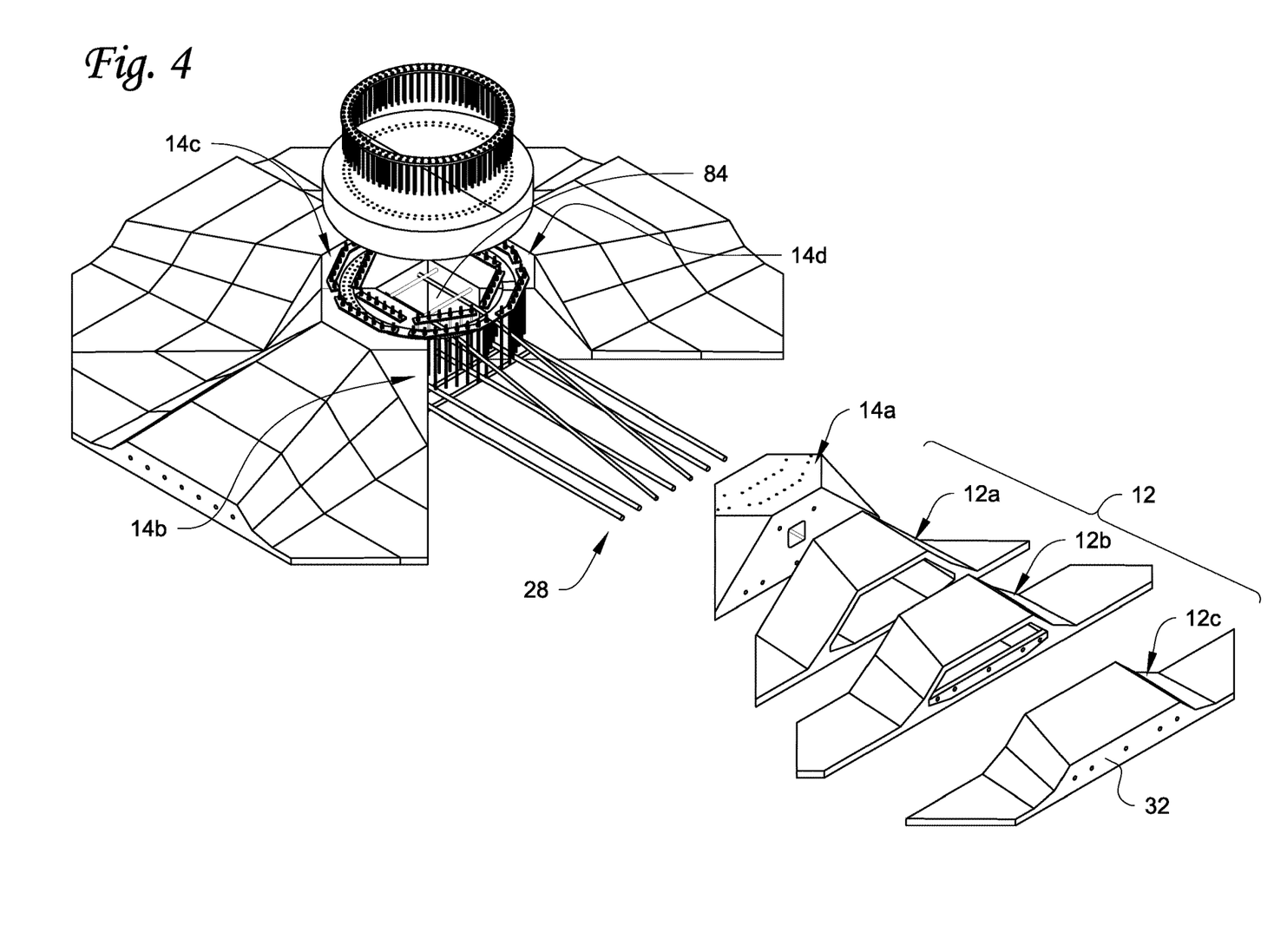
FIG. 4 is a partial exploded, perspective view of the concrete foundation of FIG. 1 showing the pre-cast concrete beam segments of one of the beams and one of the pre-cast concrete hub segments.

Referring to FIGS. 4-7, an example construction of one of the concrete beams 12 and the hub 14 is illustrated. In this example, the beams 12 are substantially identical in construction so only one beam 12 will be described in detail, it being understood that the other beams 12 are substantially identical in construction. Each beam 12 is formed from a plurality of pre-cast concrete beam segments 12a, 12b, 12c . . . n. The beam segments 12a, b, c . . . n are formed off-site (i.e. away from the intended use location of the foundation 10) and then transported, for example by one or more trucks, to the intended use site for the foundation 10 where the beam segments 12a, b, c . . . n are then assembled together to form the beams 12. FIGS. 4-6 show the use of 3 beam segments 12a, b, c . . . n for each beam 12. However, each of the beams 12 can be formed from two or more beam segments, or formed from more than three beam segments.

Assuming that each of the beams 12 is formed from three beam segments 12a, 12b, 12c, the beam segment 12a is an inner, for example radially inner, beam segment, the beam segment 12b is a middle beam segment, and the beam segment 12c is an outer, for example radially outer, beam segment. The beam segments 12a, 12b, 12c are designed to fit together face-to-face as shown in FIG. 1 so that the resulting beams 12 are generally continuous from the inner end 16 to the outer end 18.

The beam segments 12a, 12b, 12c can have any configuration that is suitable for forming the beams 12 that in turn are suitable for adequately supporting the tower 20. For example, with reference to FIGS. 4-6, the beam segments 12a, 12b, 12c can be configured such that when assembled to form the beams 12, the beams 12 have a resulting box girder configuration like that described above including the interior space 30, the upper wall 34, the bottom wall 36, the first side wall 38 and the second side wall 40. If the slab structures 22 are present, the beam segments 12a, 12b, 12c can also include structures that form the slab segments 46, 48.

Referring to FIGS. 4 and 6, the inner beam segment 12a can include an upper slab 60a, a bottom slab 62a opposite the upper slab 60a, a first side wall 64a and a second side wall 66a opposite the first side wall 64a. The upper slab 60a forms an inner part of the upper wall 34 of the beam 12, the bottom slab 62a forms an inner part of the bottom wall 36 of the beam 12, the first side wall 64a forms an inner part of the first side wall 38 of the beam 12, and the second side wall 66a forms an inner part of the second side wall 40 of the beam 12. The inner beam segment 12a can further include optional slab portions 68a, 70a that form portions of the slab segments 46, 48 if the slab segments 46, 48 are used. In this example, the inner beam segment 12a is hollow from its inner end to its outer end.

Still referring to FIGS. 4 and 6, the middle beam segment 12b can include an upper slab 60b, a bottom slab 62b opposite the upper slab 60b, a first side wall 64b and a second side wall 66b opposite the first side wall 64b. The upper slab 60b forms an inner part of the upper wall 34 of the beam 12, the bottom slab 62b forms an inner part of the bottom wall 36 of the beam 12, the first side wall 64b forms an inner part of the first side wall 38 of the beam 12, and the second side wall 66b forms an inner part of the second side wall 40 of the beam 12. The middle beam segment 12b can further include optional slab portions 68b, 70b that form portions of the slab segments 46, 48 if the slab segments 46, 48 are used. In this example, the middle beam segment 12b is substantially hollow from its inner end to its outer end. However, the beam segment can also include at least one interior stiffening wall so that the bearing stress produced on the soil can be made more even, thereby reducing peak stresses. For example, FIGS. 4 and 6 illustrate at least one stiffening wall 72 that extends upwardly from the bottom slab 62b and which contains holes 74 that allow passage of the cables 28 therethrough, with the stiffening wall 72 stiffening the bottom slab 62b. In the illustrated example, the wall 72 can be located at the outer end of the middle beam segment 12b. One or more additional stiffening walls 72 can be provided in any of the beam segments 12a-c, for example at the inner end of the middle beam segment 12b as best seen in FIG. 5.

Still referring to FIGS. 4 and 6, the outer beam segment 12c can include an upper slab 60c, a bottom slab 62c opposite the upper slab 60c, a first side wall 64c and a second side wall 66c opposite the first side wall 64c. The upper slab 60c forms an inner part of the upper wall 34 of the beam 12, the bottom slab 62c forms an inner part of the bottom wall 36 of the beam 12, the first side wall 64c forms an inner part of the first side wall 38 of the beam 12, and the second side wall 66c forms an inner part of the second side wall 40 of the beam 12. The outer beam segment 12c can further include optional slab portions 68c, 70c that form portions of the slab segments 46, 48 if the slab segments 46, 48 are used. In this example, the outer beam segment 12c is substantially hollow from its inner end extending toward its outer end, but the outer end is closed by the end wall 32.

When the individual beam segments 12a-c are assembled together, they form the beams 12 illustrated in FIGS. 1-3 and 5. If the slab structures 22 are present, the assembled beam segments 12a-c also form the slab structures 22 between the beams 12 as shown in FIGS. 1-3. However, if the slab structures 22 are not present, when the beam segments 12a-c are assembled together as shown in FIG. 8, the gaps 24 are created between the beams 12.

Returning to FIGS. 4 and 6, the hub 14 can also be formed from a plurality of pre-cast concrete hub segments 14a, 14b, 14c . . . n. The hub segments 14a, b, c . . . n are formed off-site (i.e. away from the intended use location of the foundation 10) and then transported, for example by one or more trucks, to the intended use site for the foundation 10 where the hub segments 14a, b, c . . . n are then assembled together to form the hub 14. The figures show the use of four hub segments 14a, b, c, d . . . n, one hub segment for each beam 12. However, the hub 14 can be formed from two or more hub segments, or formed from more than four hub segments.

The hub segments 14a-d are designed to fit together into a ring shape to define the hub 14. The hub segments 14a-d can have any configuration that is suitable for forming the hub 14 that in turn is suitable for adequately supporting the tower 20. In this example, the hub segments 14a-d are substantially identical in construction so only one hub segment, in particular hub segment 14a, will be described in detail, it being understood that the other hub segments are substantially identical in construction.

As shown in FIGS. 4 and 6, the hub segment 14a an inner facing end wall 80 and an outer facing end wall 82. The inner facing end wall 80 is substantially flat and planar and when the hub segments 14a-d are assembled together, the inner facing end walls 80 create a generally rectangular opening 84 as best seen in FIG. 4. The outer facing end wall 82 is substantially flat and planar and is designed to abut against the inner end 16 of the beam segment 12a when the beam segments are assembled. The hub segment 14a further includes a first side wall 86 and a second side wall 88. The side walls 86, 88 are substantially flat and planar and abut against the side walls 86, 88 of the adjacent hub segments 14c-d when the hub segments are assembled so that the hub segments form a continuous ring. The hub segment 14a further includes beveled walls 90, 92 between the end wall 82 and the side walls 86, 88. The beveled walls 90, 92 are substantially flat and planar, and as best seen in FIG. 1, the beveled walls 90, 92 of adjacent hub segments align with one another at 94 when the hub segments 14a-d are assembled.

The hub segment 14a can also include an opening 96 that extends from the outer end wall 82 toward the inner end wall 80, and stop either short of the inner end wall 80 or extend through the inner end wall 80. The opening 96 permits a human to pass through the hub segment 14a and into the hollow beam 12. The hub segment 14a further includes holes 98 that allow the passage of the post-tensioning cables 28 therethrough.

The hub 14, whether made of a single piece of concrete or made of the hub segments 14a-d, is suitably fixed to the tower 20 in any suitable manner to attach the tower 20 to the hub 14. In the illustrated example of FIGS. 1, 4 and 5, an adaptor plate 100 is provided that interfaces the tower 20 with the hub 14. The adaptor plate 100, which can be made of metal or concrete, is fixed to the top of the hub 14 via a series of vertical bolts 102. A second series of vertical bolts 104 connect a base flange of the tower 20 to the adaptor plate 100.

As described above, the post-tensioning cables 28 are used to hold the beams 12 and the hub 14 together. Returning to FIG. 5, some of the cables 28 extend near the base of the foundation and extend in a straight line from one end wall 32 of one beam 12 to the end wall 32 of the diametrically opposite beam 12, through the holes 98 in the corresponding hub segments 14a, 14c. These cables 28 also extend through the interior wall(s) 72 of the beam segment 12b. Other ones of the cables 28 extend at an angle from the end wall 32 of the beam, through the holes 98 in the hub segments 14a, 14c, and then angle back down where they are secured to the end wall 32 of the diametrically opposite beam 12.

In one example, the box-girder beams 12 and the hub 14 are pre-cast from concrete off-site and then transported to the intended use site for the foundation 10. The box-girder beams 12 and the hub 14 are then assembled together, and the post-tensioning strands 28 are installed to secure the beams 12 and the hub 14 together.

In the example where the box-girder beams 12 and the hub 14 are fabricated from beam segments, such as beam segments 12a-c, and from hub segments, such as hub segments 14a-d, the beam segments and the hub segments are pre-cast off-site, and then transported to the intended use site for the foundation 10. The pre-cast segments are then assembled in the field at the use site and the post-tensioning strands 28 are installed to secure the beams 12 and the hub 14 together.

Figure 9:
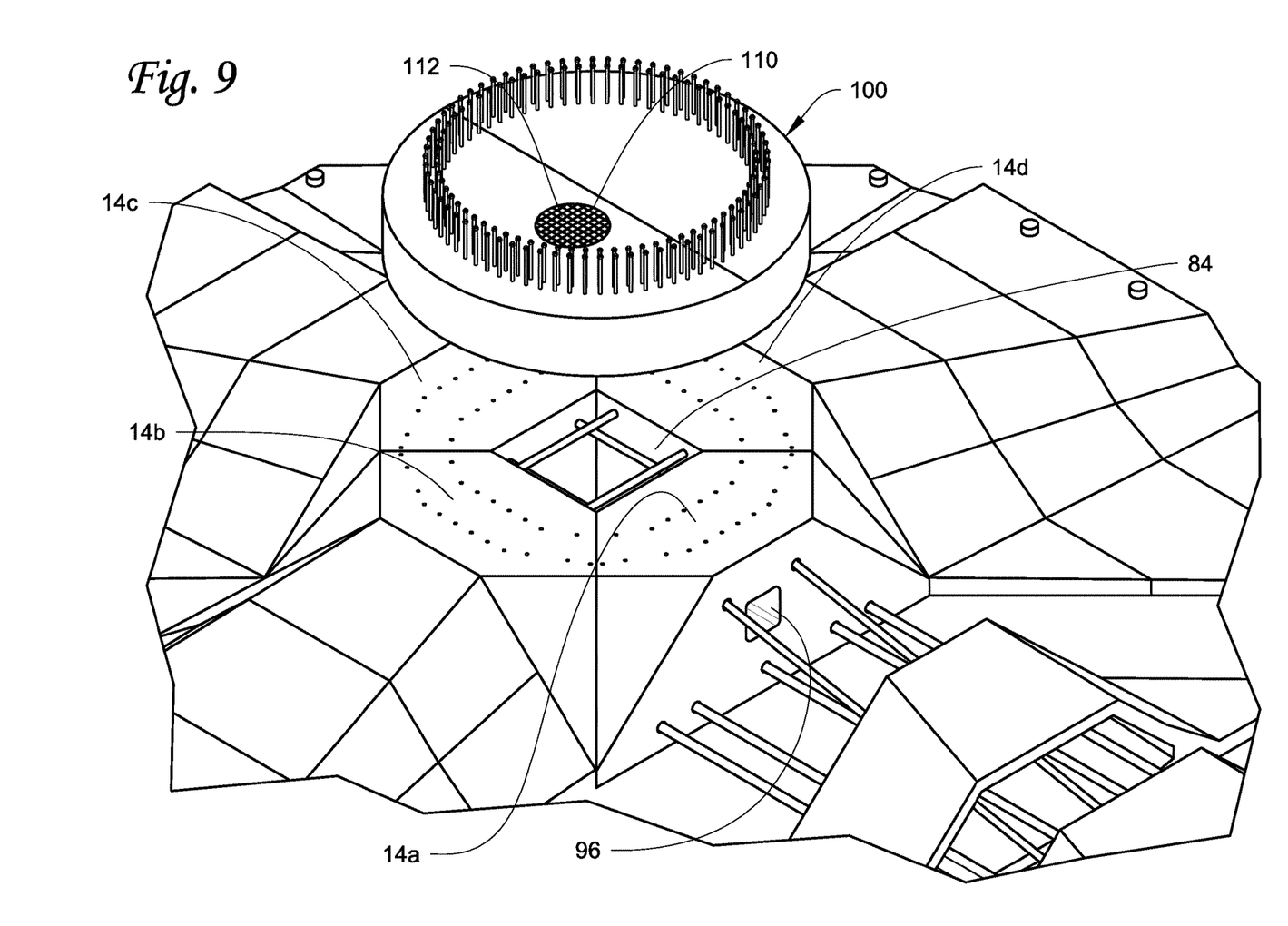
FIG. 9 illustrates an embodiment that permits human access to the interior of the hub and the interior of the beams.

Referring to FIG. 9, in embodiments where the hub 14 is hollow (for example, the hub 14 includes an opening such as the rectangular opening 84), an access port 110 can be provided in the adaptor plate 100. A door 112 that can be opened and closed can be provided on the access port 110 to control access to the access port 110. The access port 110 allows personnel, such as one or more maintenance workers, to enter into the hub 14, and then pass through the hub segments 14a-d via the openings 96 and then into the beams 12 (if the beams 12 are constructed as box girders). This permits inspection, maintenance and decommissioning of the foundation 10 and its separate components.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A wind turbine foundation, comprising:
   a center hub that is configured to be secured to a tower of a wind turbine;
   a plurality of pre-cast concrete beams secured to and projecting radially outward from the hub, each of the pre-cast concrete beams is formed as a box girder construction.

2. The wind turbine foundation of claim 1, wherein each of the pre-cast concrete beams is formed from a plurality of pre-cast concrete beam segments that are assembled together.

3. The wind turbine foundation of claim 2, wherein there are three of the pre-cast concrete beam segments for each of the pre-cast concrete beams.

4. The wind turbine foundation of claim 2, wherein at least two of the pre-cast concrete beam segments are hollow from an inner end to an outer end thereof.

5. The wind turbine foundation of claim 1, wherein the center hub is formed from pre-cast concrete.

6. The wind turbine foundation of claim 1, wherein the center hub is formed from a plurality of pre-cast concrete hub segments that are assembled together.

7. The wind turbine foundation of claim 6, wherein there are four of the pre-cast concrete hub segments.

8. The wind turbine foundation of claim 6, wherein the pre-cast concrete hub segments fit together into a ring shape.

9. A wind turbine foundation, comprising:
- a center hub that is configured to be secured to a tower of a wind turbine;
- a plurality of pre-cast concrete beams secured to and projecting radially outward from the hub, each of the pre-cast concrete beams is formed from a plurality of pre-cast concrete beam segments that are assembled together;
- a plurality of post tensioning cables in the pre-cast concrete beam segments that secure the pre-cast concrete beam segments to one another and to the center hub.

10. The wind turbine foundation of claim 9, wherein each of the post tensioning cables extends from an outer end of each pre-cast concrete beam to an inner end of each pre-cast concrete beam.

11. The wind turbine foundation of claim 9, wherein the center hub is formed from pre-cast concrete.

12. The wind turbine foundation of claim 9, wherein the center hub is formed from a plurality of pre-cast concrete hub segments that are assembled together.

13. The wind turbine foundation of claim 12, wherein there are four of the pre-cast concrete hub segments.

14. The wind turbine foundation of claim 12, wherein the pre-cast concrete hub segments fit together into a ring shape.

\* \* \* \* \*